United States Patent Office 3,723,249
Patented Mar. 27, 1973

3,723,249
METHOD OF PRODUCING L-ARGININE BY MICROORGANISM
Koji Kubota and Hirotaka Kamijo, Kanagawa-ken, Takiko Onoda, Tokyo, Fumihiro Yoshinaga, Kanagawa-ken, and Shinji Okumura, Tokyo, Japan, assignors to Ajinomoto Co., Inc., Tokyo, Japan
No Drawing. Filed Feb. 12, 1971, Ser. No. 115,116
Claims priority, application Japan, Feb. 21, 1970, 45/15,108
Int. Cl. C12d 1/00
U.S. Cl. 195—47         5 Claims

ABSTRACT OF THE DISCLOSURE

Certain bacteria of the genera Brevibacterium and Corynebacterium produce extracellularly L-arginine in amounts sufficient to warrant recovery on a commercial scale when cultured on a glucose or acetic acid medium.

---

This invention relates to a method of producing L-arginine by bacterial fermentation.

L-arginine is an important amino acid, and has been used as a food additive, in medicine and as an animal feed additive.

L-arginine has been prepared on a commercial scale from natural protein hydrolyzate at relatively high cost in a complex isolation procedure. Certain strains of *Corynebacterium oleophila* and *Brevibacterium incertum* have been known to produce L-arginine from hydrocarbon in a very low concentration (U.S. Pats. 3,222,258 and 3,440,141).

We have now found that certain bacteria of genus Brevibacterium and Corynebacterium have the ability to produce extracellular L-arginine when cultured in a medium containing a carbohydrate, an organic acid or an alcohol as the carbon source.

Microorganisms which can be used in the present invention include *Brevibacterium flavum* ATCC 21493 and *Corynebacterium acetoacidophilum* AJ-3278 (FERM P-630, the FERM P-number is the deposit accession number of the Fermentation Research Institute, Agency of Industrial Science of Technology, the Ministry of the Industrial Trade and Industry, Japan).

The culture media used in the present invention are conventional in themselves, and contain assimilable carbohydrate, organic acid or alcohol as the carbon source, an assimilable nitrogen source and inorganic salts. Minor amounts of organic nutrients, such as vitamins, amino acids, corn steep liquor, protein hydrolyzate or peptone may also be added to the culture media. Examples of assimilable carbohydrates are glucose, sucrose, starch hydrolyzate and starch. Assimilable organic acids are acetic acid, gluconic acid, succinic acid and citric acid, and a suitable alcohol is ethanol.

For a good yield of L-arginine, the fermentation is carried out aerobically with stirring, aeration and/or agitation. The fermentation is performed at 24° to 37° C. for 2 to 7 days at a pH of 5.0 to 9.0. The desired pH may be maintained by adding an inorganic or organic acid, or an alkaline compound, such as urea, calcium carbonate or gaseous ammonia to the medium.

The L-arginine accumulated in the fermentation broth can be recovered by conventional methods, such as by using ion exchange resin in combination with precipitation. The L-arginine was identified by its ninhydrin reaction on a paper chromatogram, the Rf value on the paper chromatogram, a positive Sakaguchi reaction and growth curves of arginine requiring mutants of lactic acid bacteria. The L-arginine in the broth was determined by bioassay employing *Leuconostoc mesenteroides* ATCC 8042.

EXAMPLE 1

300 ml. batches of a medium containing 10 g./dl. glucose, 0.1 g./dl. $KH_2PO_4$, 0.04 g./dl. $MgSO_4 \cdot 7H_2O$, 4 g./dl. $(NH_4)_2SO_4$, 100 γ/l. biotin, 200γ/l. vitamin $B_1 \cdot HCl$. 2 p.p.m. Fe and Mn ions, 1 ml./dl. "Aji-Eki" (brand name of soybean protein hydrolyzate) and 5 g./dl. $CaCO_3$, of pH 7.0 were placed in glass jar fermentors. After sterilization, each medium was inoculated with *Brevibacterium flavum* ATCC 21493 which had previously been cultured on a bouillon slant at 30° C. for 24 hours, and cultured at 31° C. for 48 hours with aerating and stirring. The cultured broth was found to contain 2.1 g./dl. L-arginine.

One litre of the cultured broth was centrifuged to remove bacterial cells and other solid substances, the supernatant was passed through a column packed with a cation exchange resin (Amberlite C–50 $NH_4^+$ type) and L-arginine was eluted with 2-normal aqueous ammonia, the eluate was concentrated to precipitate crude crystalline L-arginine which was recrystallized from water, and 12 g. pure L-arginine was obtained.

EXAMPLE 2

*Corynebacterium acetoacidophilum* AJ–3278 (FERM P–630 was cultured on a 20 ml. medium containing 10 g./dl. sucrose, 0.1 g./dl. $KH_2PO_4$, 0.04 g./dl. $MgSO_4 \cdot 7H_2O$, 4 g./dl. $(NH_4)_2SO_4$, 200γ/l. biotin, 200γ/l. vitamin $B_1 \cdot HCl$, 2 p.p.m. Fe and Mn ions and 5 g./dl. $CaCO_3$, of pH 7.0, at 30° C. for 72 hours with shaking. The cultured broth was found to contain 1.8 g./dl. L-arginine.

EXAMPLE 3

*Brevibacterium flavum* ATCC 21493 was cultured at 31.5° C. for 12 hours on a seed culture medium containing 3.0 g./dl. starch hydrolyzate (glucose equivalent), 0.3 g./dl. ammonium acetate, 0.15 g./dl. $KH_2PO_4$, 0.04 g./dl. $MgSO_4 \cdot 7H_2O$, 2 p.p.m. Fe and Mn ions, 3.0 ml./dl. "Aji-Eki," 50γ/l. biotin, 300γ/l. vitamin $B_1 \cdot HCl$ and 0.2 g./dl. urea, of pH 7.0.

15 ml. of the seed culture was added as an inoculate to 300 ml. main culture medium containing, per decilitre, 0.8 g. ammonium acetate, 0.41 g. sodium acetate, 0.10 g. $KH_2PO_4$, 0.04 g. $MgSO_4 \cdot 7H_2O$, 2 p.p.m. Fe and Mn ions, 0.2 g./dl. urea, 2 ml. "Aji-Eki," 50γ/l. biotin and 200γ/l., in a 500 ml. jar fermentor, and the culture was held at 31.5° C. with shaking at 1350 cycles per minute while ½ volume of air was introduced each minute.

When the pH of the medium reached 8.2 after 6 hours from the inoculation, 60% acetic acid and gaseous ammonia was added to hold the pH of the medium within a range of 7.5 and 8.0. After 48 hours, 0.18 volume of acetic acid per volume of initial medium was consumed, and the culture broth was found to contain 2.60 g./dl. L-arginine (10.0% yield based on used acetic acid). From 500 ml. cultured broth, 10.0 g. of L-arginine was obtained.

EXAMPLE 4

*Corynebacterium acetoacidophilum* FERM P–630 was cultured for 55 hours in the same way as in Example 3, 0.16 volume acetic acid was used per volume of the initial medium, and 1.22 g./dl. L-arginine was found in the cultured broth.

EXAMPLE 5

A culture medium containing 1.5 ml./dl. ethanol, 0.5 g./dl. $(NH_4)_2SO_4$, 0.1 g./dl. $KH_2PO_4$, 0.04 g./dl. $MgSO_4 \cdot 7H_2O$, 2 p.p.m. Fe ions, 2 ml./dl. "Aji-Eki," 100γ/l. biotin, 50γ/l. vitamin $B_1 \cdot HCl$ and 0.1 ml./dl. corn steep liquor, of pH 7.2 was prepared. A 300 ml. batch of the medium was placed in a glass jar fermentor, and inoculated with 30 ml. of a seed culture of *Brevibacterium flavum* ATCC 21493 which had been prepared in the same way as in Example 3. The fermentation was performed at 30° C. with stirring of 1500 r.p.m. and with introducing the same volume of air as that of the medium per minute. During the fermentation, the pH of the medium was maintained within a range of 7.0 to 7.5 by adding gaseous ammonia. Ethanol was fed to the medium from time to time when the amount of ethanol in the medium decreased below 0.1 ml./dl. as determined by gas chromatography.

After 48 hours cultivation, 0.96 g./dl. L-arginine was found in the cultured broth (8.2% yield based on used ethanol).

EXAMPLE 6

*Corynebacterium acetoacidophilum* FERM P-630 was cultured in the same way as in Example 5, and the cultured broth was found to contain 0.75 g./dl. L-arginine (7.3% yield based on used ethanol).

What we claim is:

1. A method of producing L-arginine which comprises:
   (a) culturing a bacterium selected from the group consisting of *Brevibacterium flavum* ATCC 21493 and *Corynebacterium acetoacidophilum* P-630 in a culture medium containing an assimilable carbohydrate, an assimilable organic acid, or an assimilable alcohol as the carbon source, an assimilable source of nitrogen, and minor nutrients necessary for the growth of said bacterium until L-arginine accumulates in said medium; and
   (b) recovering the accumulated L-arginine from said medium.

2. A method as set forth in claim 1, wherein said bacterium is *Brevibacterium flavum* ATCC 21493.

3. A method as set forth in claim 1, wherein said bacterium is *Corynebacterium acetoacidophilum* FERM P-630.

4. A method as set forth in claim 1, wherein said assimilable carbon source is glucose or acetic acid.

5. A method as set forth in claim 4, wherein said carbon source is acetic acid and is added to the culture medium from time to time during said culturing.

References Cited

Udaka, S., J. Bact., vol. 91, pp. 617-21, 1966.

LIONEL M. SHAPIRO, Primary Examiner

G. M. NATH, Assistant Examiner

U.S. Cl. X.R.

195—30, 49